(12) United States Patent
Townsend

(10) Patent No.: US 8,807,517 B2
(45) Date of Patent: Aug. 19, 2014

(54) ROTARY PINCH VALVE

(75) Inventor: Michael Townsend, Waitsburg, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 868 days.

(21) Appl. No.: 12/958,085

(22) Filed: Dec. 1, 2010

(65) Prior Publication Data

US 2012/0138832 A1   Jun. 7, 2012

(51) Int. Cl.
*F16K 7/04* (2006.01)
*F16K 7/06* (2006.01)

(52) U.S. Cl.
CPC ........................................ *F16K 7/065* (2013.01)
USPC ............................................. 251/9; 251/251

(58) Field of Classification Search
USPC ............. 251/90, 9, 212, 251, 4, 5, 6, 7, 8, 10, 251/340, 298, 342, 343, 344, 345; 604/34, 604/248, 250
See application file for complete search history.

(56) References Cited

U.S. PATENT DOCUMENTS

| | | | |
|---|---|---|---|
| 3,467,151 A * | 9/1969 | Vogt | 141/67 |
| 3,550,861 A | 12/1970 | Teson | |
| 3,685,786 A | 8/1972 | Woodson | |
| 3,920,215 A | 11/1975 | Knauf | |
| 4,205,819 A | 6/1980 | Soika | |
| 4,328,834 A * | 5/1982 | Oates et al. | 137/636.1 |
| 4,412,669 A * | 11/1983 | Hanyu et al. | 251/4 |
| 4,634,421 A * | 1/1987 | Hegemann | 604/34 |
| 5,127,626 A * | 7/1992 | Hilal et al. | 251/149.1 |
| 5,918,447 A * | 7/1999 | Hanten et al. | 53/551 |
| 7,168,444 B2 * | 1/2007 | Sesser et al. | 137/505.25 |
| 7,370,667 B2 * | 5/2008 | Sesser et al. | 137/505.25 |
| 7,775,501 B2 * | 8/2010 | Kees | 251/7 |
| 8,282,069 B2 * | 10/2012 | Landry | 251/4 |

FOREIGN PATENT DOCUMENTS

JP            58046271            3/1983

* cited by examiner

*Primary Examiner* — John Bastianelli
*Assistant Examiner* — Andrew J Rost
(74) *Attorney, Agent, or Firm* — Nixon & Vanderhye P.C.

(57) ABSTRACT

A rotary pinch valve includes a valve body having an inlet and an outlet; the valve body supporting a pinch tube and a pair of pivotally mounted pinch arms, the pinch tube forming part of an axial flowpath from said inlet to said outlet. A valve actuator dial is received on the valve body and formed with a pair of internal cam lobes engageable, respectively, with cam follower surfaces on each of the pair of pivotally mounted pinch arms upon rotation of the valve actuator dial to pivot the pair of pinch arms from an open position out of engagement with the pinch tube to a closed position where the pinch arms engage and close the pinch tube to thereby shut off flow through the valve body.

18 Claims, 16 Drawing Sheets

ROTARY PINCH VALVE

BACKGROUND

The present invention relates to a rotary pinch valve for quickly turning on or shutting off the flow of water to, for example, a sprinkler or other irrigation device.

Pinch valves have long been used in various applications as an efficient way to control the flow of fluid through a conduit, oftentimes with the aid of a pinch tube located within the valve that is squeezed to shut off the flow of fluid through the valve. There are many examples of pinch valves in the patent literature including, U.S. Pat. Nos. 3,550,861; 3,685,786; 3,920,215 and 4,205,819. There remains a need, however, for a pinch valve that is simple, effective and reliable, and that minimizes wear on the internal pinch tube over the life of the valve.

BRIEF SUMMARY OF THE INVENTION

In one exemplary but nonlimiting embodiment, the invention relates to a rotary pinch valve comprising a valve body having an inlet and an outlet; the valve body supporting a pinch tube and a pair of pivotally mounted pinch arms, the pinch tube forming part of an axial flowpath from the inlet to the outlet; a valve actuator dial received on the valve body and formed with a pair of internal cam lobes engageable, respectively, with cam follower surfaces on each of the pair of pivotally mounted pinch arms upon rotation of the valve actuator dial to pivot the pair of pinch arms from an open position out of engagement with the pinch tube to a closed position where the pinch arms engage and close the pinch tube to thereby shut off flow through the valve body.

In another exemplary but nonlimiting aspect, the invention relates to a rotary pinch valve comprising a valve body having an inlet and an outlet; the valve body supporting a pinch tube and a pair of pivotally mounted pinch arms, the pinch tube forming part of an axial flowpath from the inlet to the outlet; a valve actuator dial received on the valve body and formed with a pair of internal cam lobes engageable, respectively, with cam follower surfaces on each of the pair of pivotally mounted pinch arms upon rotation of the valve actuator dial to pivot the pair of pinch mins from an open position out of engagement the pinch tube to a closed position where the pinch arms engage and close the pinch tube to thereby shut off flow through the valve body; wherein the cam follower surfaces on each pinch arm include first and second cam follower surfaces engageable, sequentially, with respective first and second actuator surfaces on each of the pair of internal cam lobes, causing the pinch arms to move from the open position to the closed position; and further wherein each pinch arm is formed with a pivot post at one end and the pair of cam follower surfaces at an opposite end, with an elongated arm element extending therebetween, one edge of the elongated arm formed as a pinch surface engageable with the pinch tube.

In still another aspect, there is provided rotary pinch valve comprising a valve body having an inlet and an outlet; the valve body supporting a pinch tube forming part of an axial flowpath from the inlet to the outlet and a pair of elongated, pivotally mounted pinch arms, each having a substantially straight pinch edge for engaging the pinch tube; a valve actuator dial received on the valve body and formed with a pair of internal cam lobes engageable, respectively, with cam follower surfaces on each of the pair of pivotally mounted pinch arms upon rotation of the valve actuator dial to pivot the pair of pinch arms from an open position out of engagement the pinch tube to a closed position where the pinch arms engage and close the pinch tube to thereby shut off flow through the valve body; wherein the pinch arms are configured such that the pinch edges of the respective pinch arms remain substantially parallel to each other during pivotal movement of the pinch arms from the open position to the closed position.

The invention will now be described in connection with the drawings identified below.

DETAILED DESCRIPTION OF THE DRAWINGS

Figure 1:
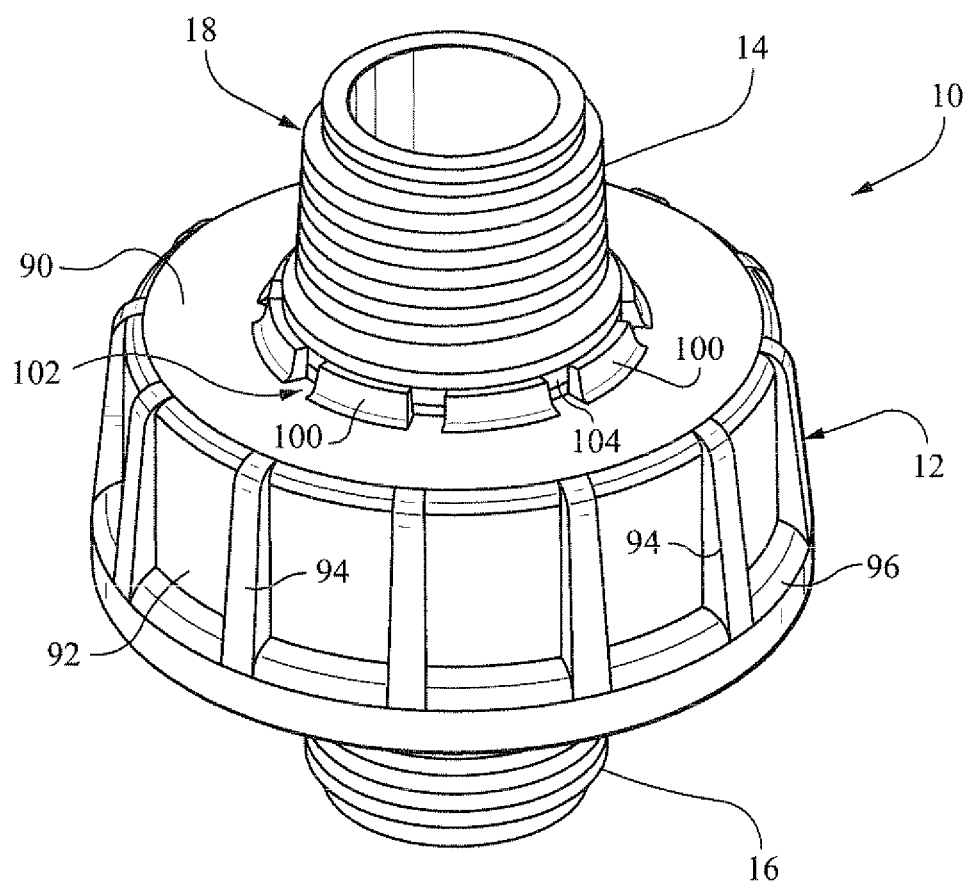
FIG. 1 is a perspective view of a rotary pinch valve in accordance with a first exemplary but nonlimiting embodiment of the invention.

FIG. 1 illustrates a pinch valve 10 provided with a valve actuator dial 12 and a pair of adaptors 14, 16 which enable an in-line connection between, fbr example, a water supply hose and a sprinkler (not shown). The adaptors 14, 16 are located at opposite ends of the pinch valve 10, as explained further below, and may have the same or different configurations to accommodate various conduits or devices to which it may be connected. The internal pinch valve mechanism within the valve operates in the same manner regardless of the direction of flow through the valve.

Figure 2:
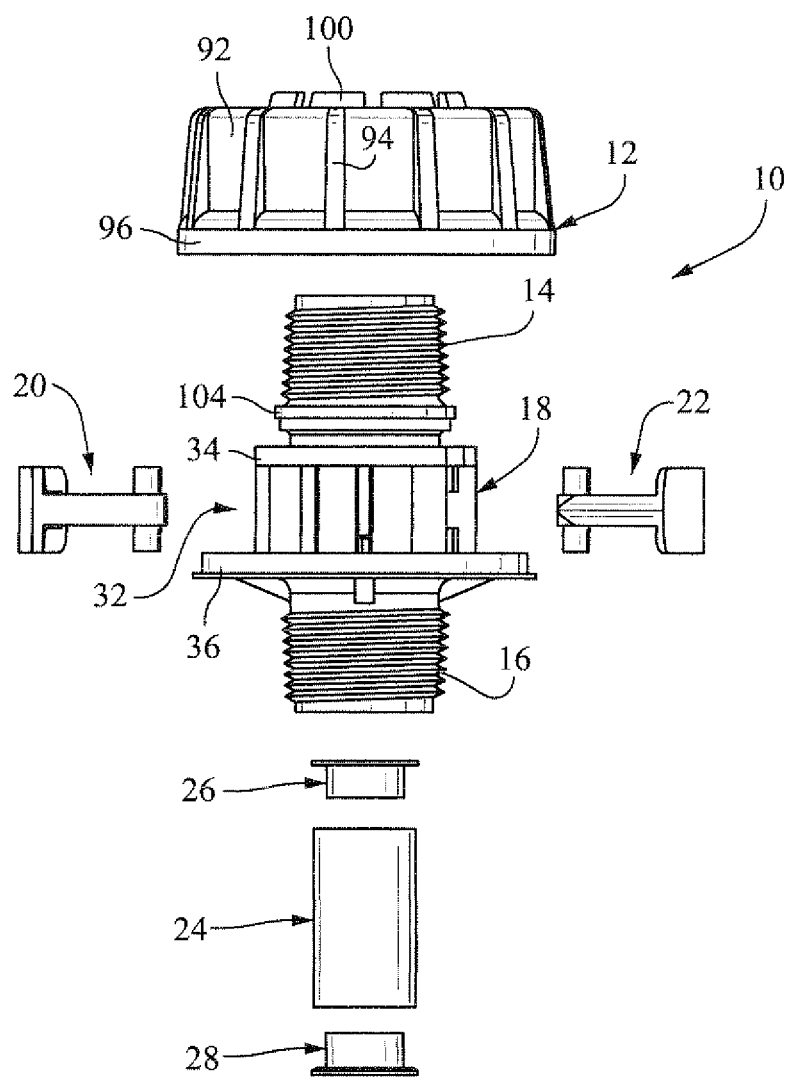
FIG. 2 is an exploded side elevation view of the rotary pinch valve shown in FIG. 1.

FIG. 2 is an exploded view of the components of the pinch valve 10, including those hidden from view in FIG. 1. In general terms, a valve body 18 is formed to include the adaptors 14, 16 and mounts a pair of pinch arms 20, 22 for pivotal movement between open and closed positions as also described further herein. The valve body 18 also supports a flexible pinch tube 24 (urethane or other suitable elastic material) that is retained in the valve body by retaining rings 26, 28. By capturing the pinch tube ends within the retaining rings, the tube ends retain their shape and remain in contact with the valve body to thereby maintain a good seal during the pinching or squeezing action of the pinch arms.

With reference also to FIGS. 3-6, the valve body 18, preferably, is a molded plastic component that includes a center cage 32 defined by first and second axially-spaced plates 34, 36 (FIGS. 3, 6) joined by diametrically-opposed wall portions 38, 40. The wall portions 38, 40 are dimensioned so as to leave substantial open spaces or windows 42, 44 (FIGS. 3, 6) therebetween which facilitate assembly and movement of the pinch arms 20, 22. The opposing flat surfaces 46, 48 of the plates 34, 36, respectively, each have a pair of arcuate, segmented guide pairs 50, 52 that project toward each other and that are axially spaced to permit pivotal movement of the pinch arms 20, 22. The lower and upper segmented guide pairs 50, 52, respectively, partially surround aligned center apertures 35, 37 (FIG. 4) in the plates 34, 36 that are, in turn, aligned with respective flow passageways in the adaptors 14, 16 providing additional support for the pinch tube 24 when the valve is in the open position. Radial tabs 51, 53 on the segmented guide pairs provide additional support and guidance for the pinch arms 20, 22 as they move between the opened and closed positions. The adaptors 14, 16 may be molded integrally with the body 18 and project axially from the opposite ends of the valve body 18. It will be appreciated, however, that the adaptors may be snap-fit, press-fit, threaded or otherwise removably attached to the center cage 32 of the body, facilitating substitution or replacement of the adaptors with others of the same or different configuration.

The pinch tube 24, with assembled retaining rings 26, 28, received in the open, opposite ends of the pinch tube, is seated in the valve body 18 with one end engaging an internal annular shoulder 54. An angled sharp edge 30 on the lower retaining ring 28 (FIG. 4) will bite into the interior wall 55 of the valve body on assembly and thereby hold the pinch tube assembly (tube 24 and retaining rings 26, 28) within the valve body 18. Thus, a sealed, axial through-passage is formed which extends through the valve body from a remote end of the adaptor 14, through the pinch tube 24, to an outlet end of the adaptor 16. As noted above, however, either end of the valve body may serve as the valve inlet. It should also be understood that any references herein to "upper" and "lower", or "clockwise" or "counterclockwise", are made merely to facilitate an understanding of the rotary pinch valve as oriented in the various figures. In use, the rotary pinch valve may be oriented in any direction.

Figure 3:
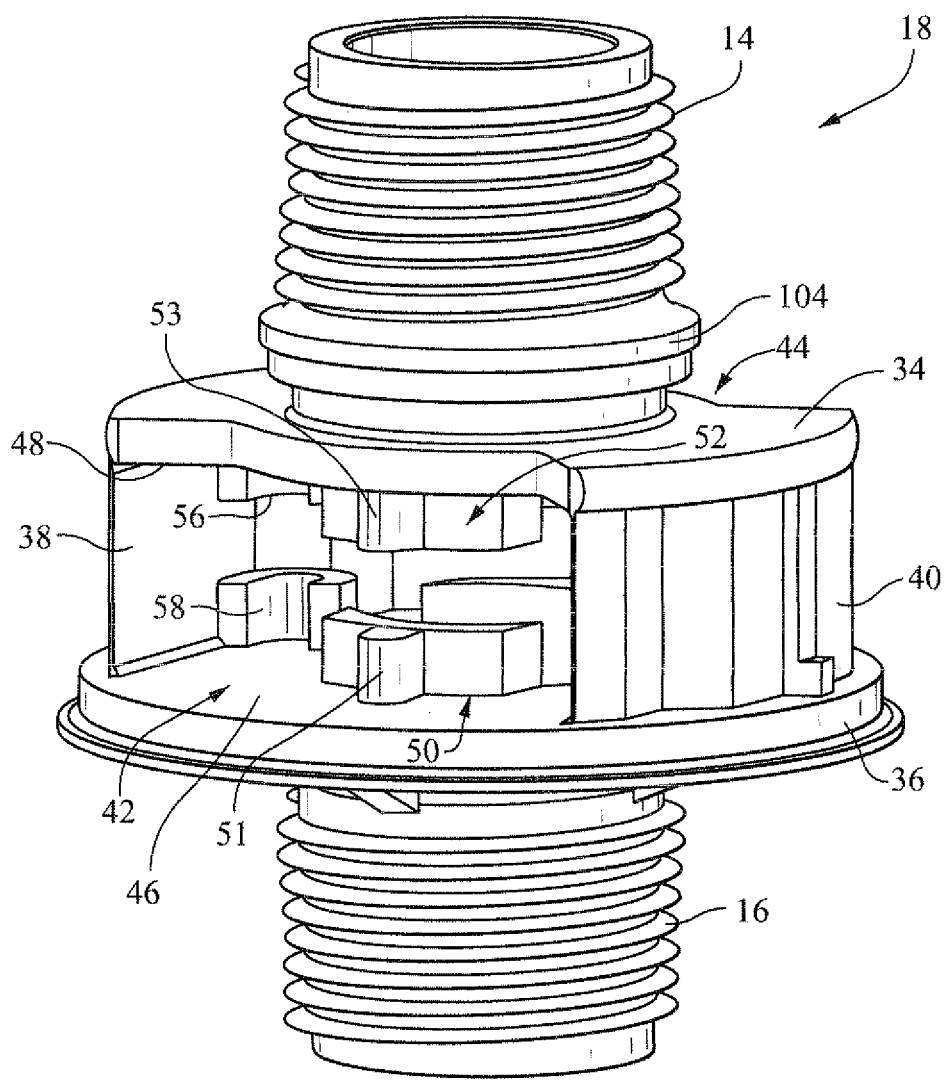
FIG. 3 is an enlarged perspective view of the valve body taken from FIG. 2.
Figure 4:
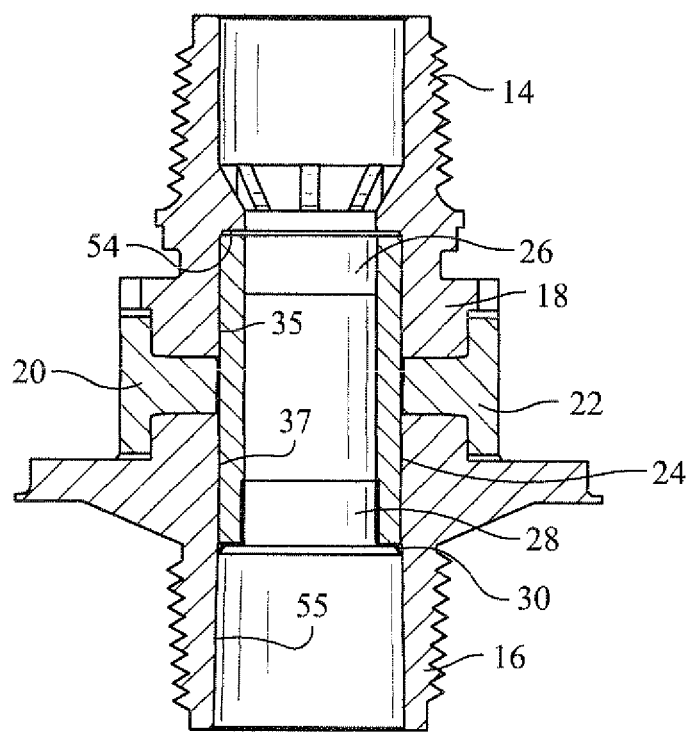
FIG. 4 is an enlarged cross-sectional view of the valve body component shown in FIG. 2, with the pinch tube and pinch arms added.
Figure 5:
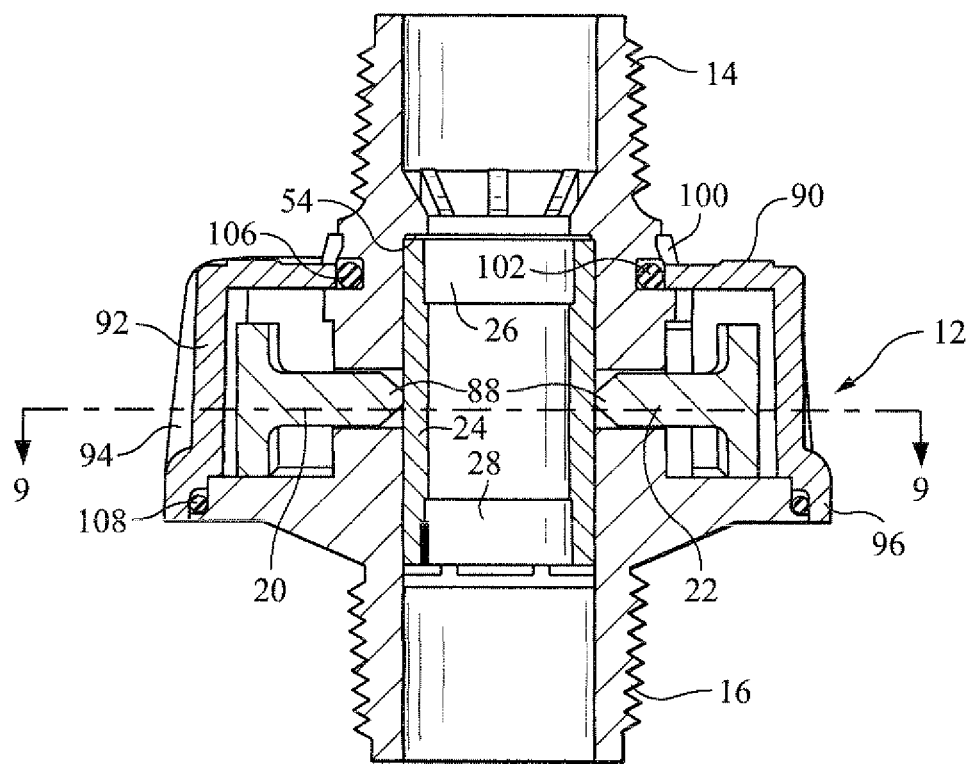
FIG. 5 is a cross-sectional view similar to FIG. 3 but taken from a different angle, and with the actuator dial installed over the valve body.
Figure 6:
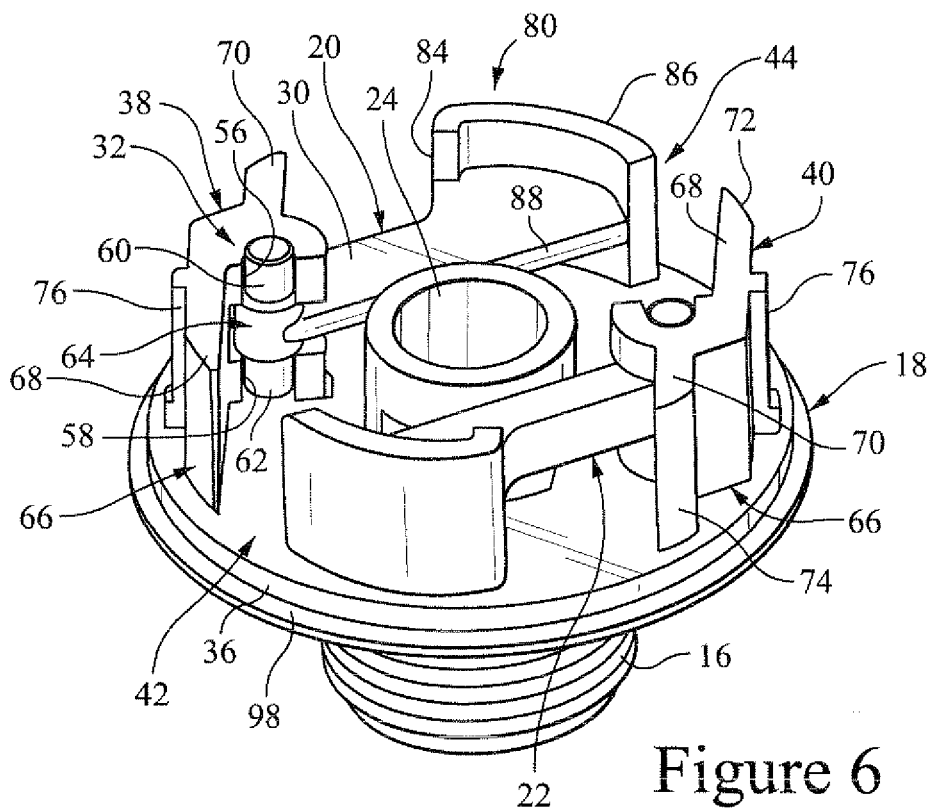
FIG. 6 is a simplified perspective view of the valve body component shown in FIG. 2 with the pinch arms installed, but with the top wall of the valve body and part of the pinch tube removed.
Figure 7:
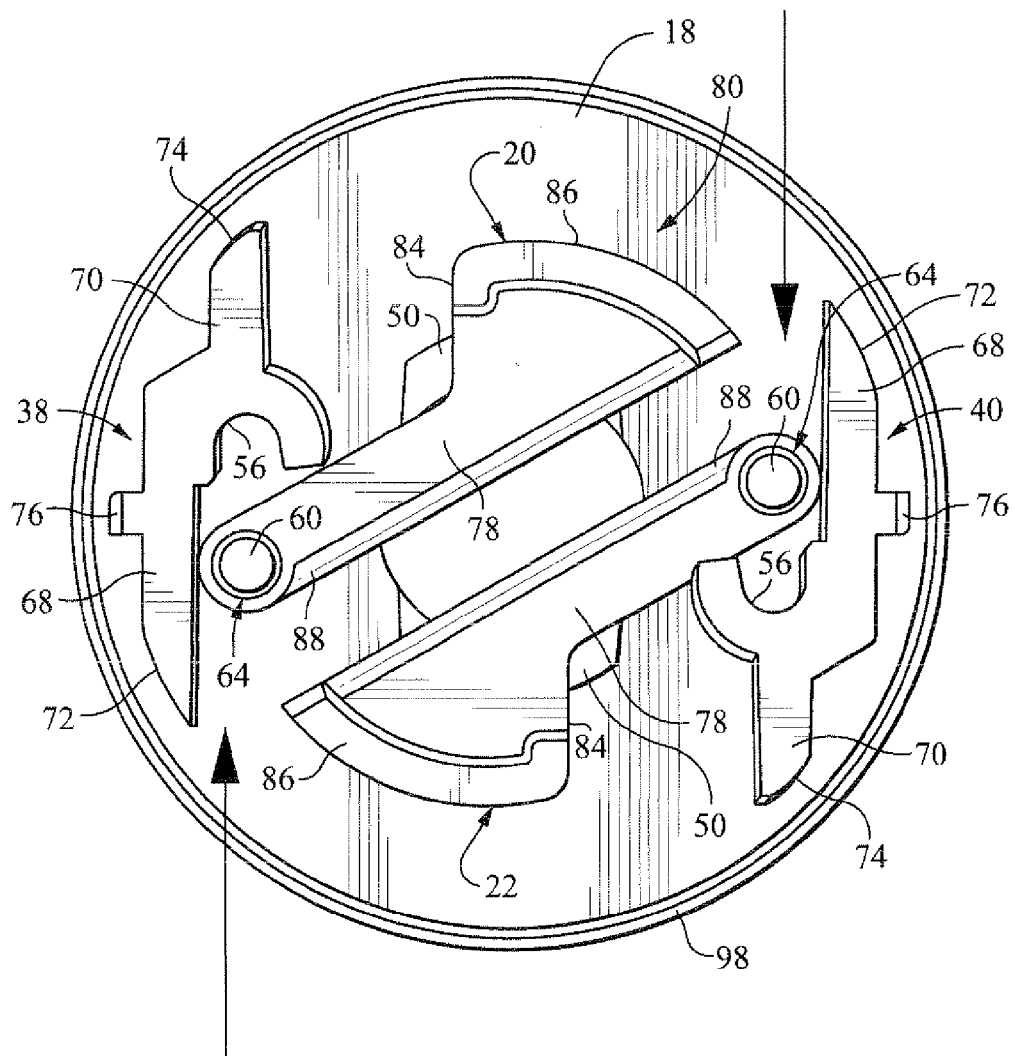
FIG. 7 is a top plan view of the valve body as shown in FIG. 6, but with the pinch arms shown ready for assembly.

The diametrically-opposed (and substantially identical) wall portions 38, 40 extend between the plates 34, 36, and are each formed to include a pair of vertically-spaced, and vertically-aligned open grooves or sockets 56, 58 that are adapted to receive ends 60, 62 of pivot posts 64 on the pinch arms 20, 22 as best seen in FIGS. 3, 6 and 7 and as described further below. The peripheral surface 66 of the wall portion 38 is formed to include offset arm portions 68, 70 that terminate at curved ends 72, 74 (FIG. 7) that will lie adjacent the complimentary-curved, internal curved surface of the dial actuator 12 as can be appreciated from FIG. 9. An outwardly projecting tab 76 cooperates with a detent on the inside of the actuator dial 12 as described further herein in connection with FIG. 13. Since the wall portion 40 is identical to the wall portion 38, it need not be described separately, and similar reference numerals are used to designate like elements/surfaces of both wall portions.

Figure 6A:
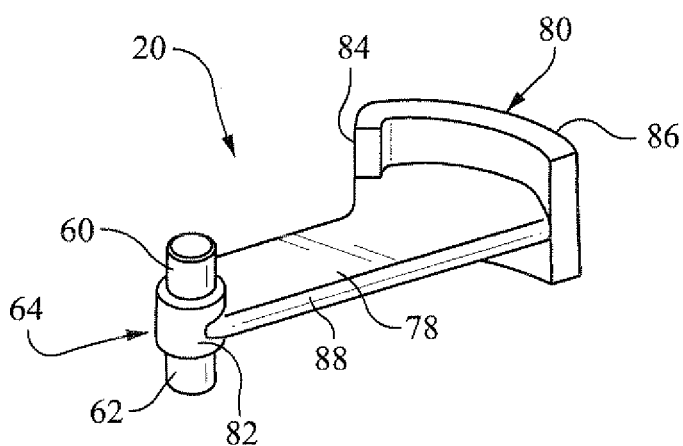
FIG. 6A is a perspective view of one of a pair of pinch arms taken from FIG. 6.

The pinch arms 20, 22 are also identical and therefore only one need be described in detail. As best seen in FIGS. 6 and 6A, and as noted above, the pinch arm 20 is formed with a vertical pivot post 64 located at one end of a flat, elongated arm portion 78, and an arcuate cam follower 80 at an opposite end. The pivot post 64 is joined to the arm portion 78 at an enlarged center region 82 (FIG. 6A) which, upon installation, is located in the space between the aligned sockets 56, 58 with the reduced-diameter ends 60, 62 seated in the sockets. The cam follower 80 is oriented substantially perpendicularly relative to the elongated arm portion 78, and with a first adjacent and substantially straight cam follower surface 84 (see also FIGS. 7-12) extending inwardly toward, but slightly offset from, the center axis of the valve body, and a second arcuate cam follower surface 86 facing outwardly toward the periphery of the valve body. A beveled or tapered pinch edge or surface 88 (see also FIG. 5) extends along the inner side of the elongated arm portion 78, from the post 64 to the cam follower 80. The orientation of the pinch arms 20, 22 relative to the pinch tube 24 is best appreciated from FIGS. 5 and 8. It may be seen that the pinch surfaces 88 of the pinch arms 20, 22 are located so as to engage the pinch tube 24 from opposite sides and midway along its length so that the pinch tube is temporarily deformed in a region substantially midway between the retaining rings 26, 28.

Figure 14:
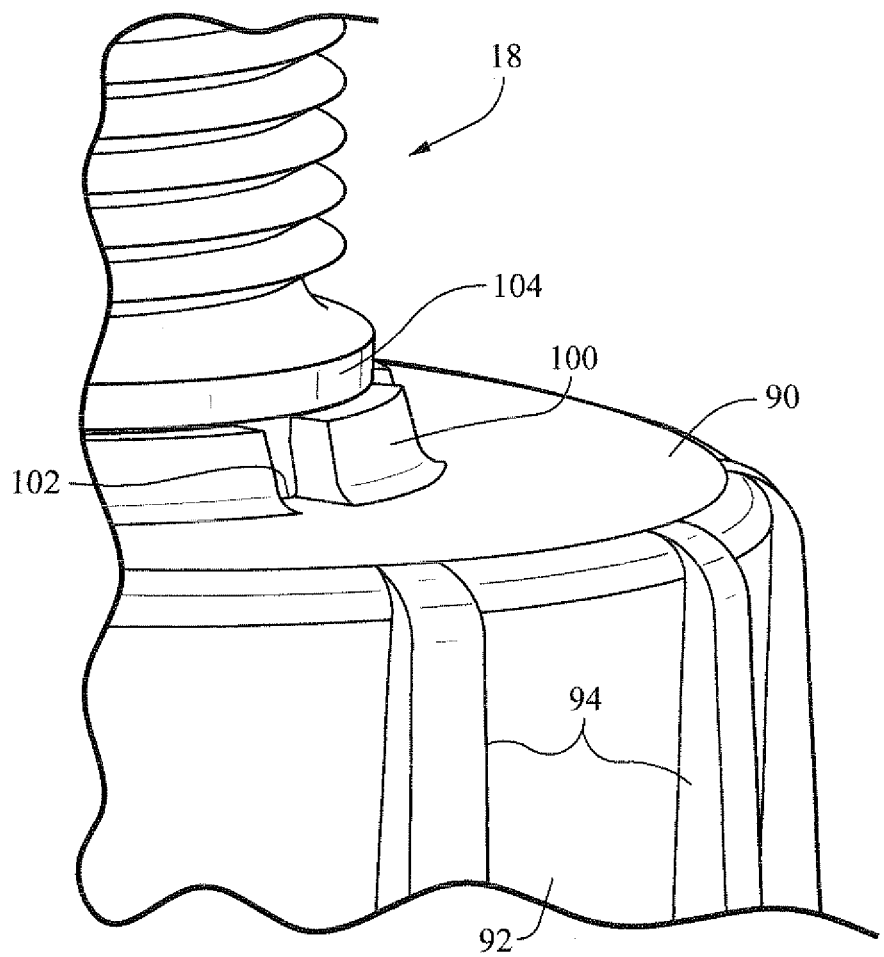
FIG. 14 is a partial perspective view showing how the actuator sleeve is secured to the valve body.

The actuator dial 12 (FIGS. 1, 2 and 5) is shaped as a round, hollow cap with a top surface 90 surrounding a center opening 102 and a peripheral skirt 92 depending from the top surface, forming a substantially hollow interior space, enabling the actuator dial to fit over, and substantially enclose the center cage 32 including the pinch arms 20, 22, wall portions 38, 40 and pinch tube 24. The peripheral skirt 92 may be reinforced by a series of external, vertically-extending ribs 94 that terminate at a lower, radially-projecting rim 96 that fits about the flanged edge 98 of the valve body lower plate 36. Resilient tabs 100 arranged about a center opening 102 in the top surface 90 snap over an annular rim 104 on the valve body, at the base of the adaptor 14 (FIGS. 1, 3 and 14). O-ring seals 106, 108 (FIG. 5) may be provided at the center opening 102 and at the flanged edge 98 to prevent debris from entering the valve body 18. Thus, the pinch valve actuator dial 12 presents a clean exterior surface with no actuator levers or knobs protruding from the dial that might otherwise break off or catch on other objects.

Figure 9:
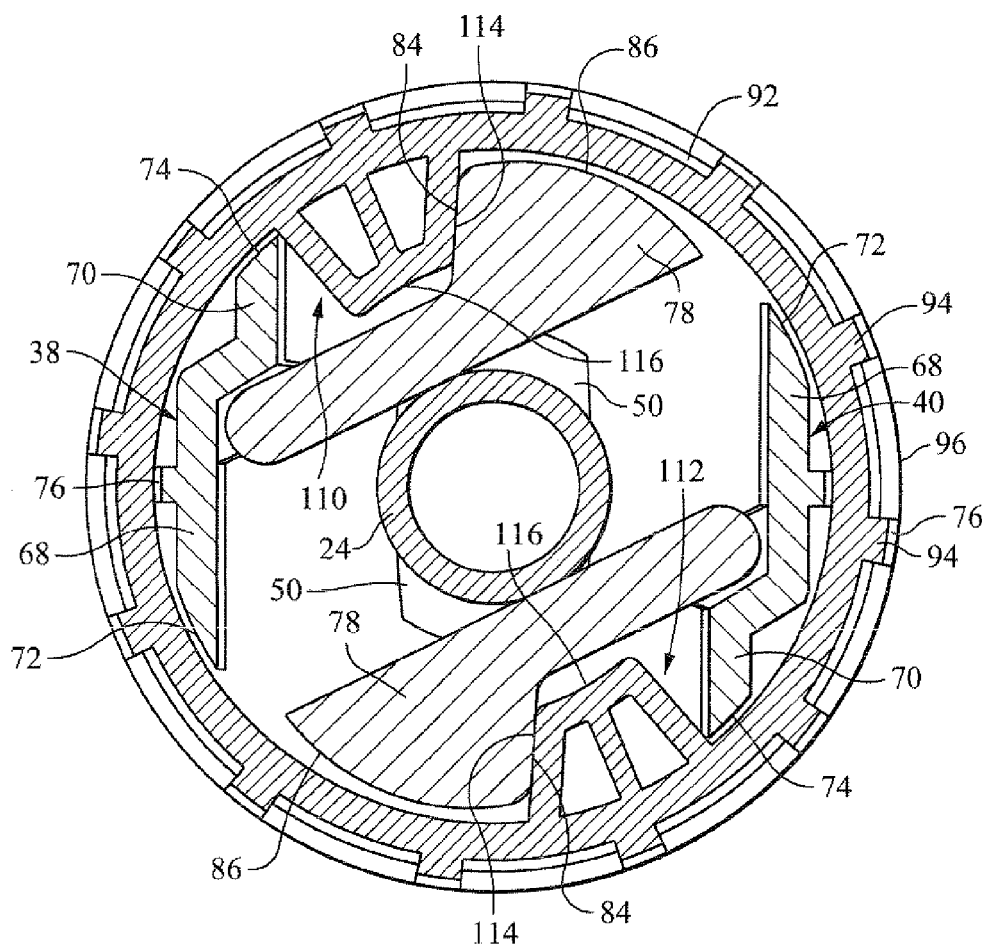
FIG. 9 is a cross section taken along the line 9-9 in FIG. 5, showing the pinch valve in an open position.

FIG. 9 best illustrates the surface configuration on the inside of the peripheral skirt 92 of the actuator dial 12. A pair of integral block-like cam lobes 110, 112 extend radially inwardly from diametrically-opposed locations, each lobe formed to include first and second actuator surfaces 114, 116 that are adapted to engage a respective pinch arm 20 or 22 as described in greater detail below. Actuator surface 114 is substantially radially-oriented while actuator surface 116 is generally parallel to the peripheral skirt 92, and approximately perpendicular to the surface 114. The cam lobes have a height dimension substantially equal to the height of the cam followers 80 on the pinch arms 20, 22. Diametrically-opposed notches 118 (one shown in FIG. 13) in the peripheral skirt 92 receive the tabs 76 when the actuator dial is rotated to its fully closed position to prevent accidental re-opening of the valve. It will be understood, however, that the actuator dial 12 may nevertheless be rotated in an opposite direction to open the valve with the exertion of force sufficient to overcome the notched arrangement. Arcuate surfaces 84 of the pinch arms 20, 22 are located closely adjacent to the peripheral skirt 92 when the pinch arms are in the fully open position as best seen in FIG. 9.

Figure 8:
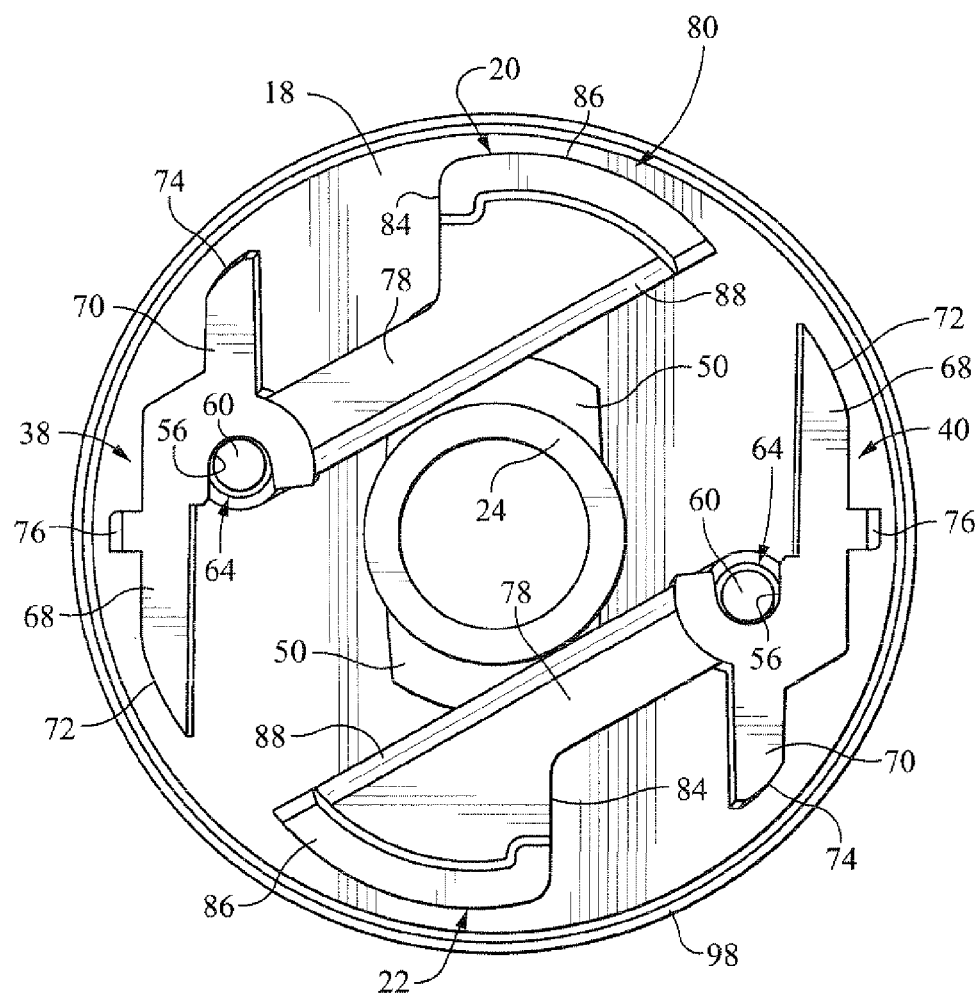
FIG. 8 is a top plan view of the valve body as shown in FIG. 7, but with the pinch arms installed.

The operation of the pinch valve 10 will now be described with reference to the rotation sequence illustrated in FIGS. 8-12. FIGS. 8 and 9 show the pinch arms 20, 22 in an open position, with the first actuator surfaces 114 of the cam lobes 110, 112 engaged with the first cam follower surfaces 86 of the pinch arms 20, 22. In this position, the cam lobes 110, 112 allow the pinch arms 20, 22 to be forced outwardly by the elasticity of the pinch tube 24, and/or the water pressure within the pinch tube. As such, the valve remains fully open, allowing water as well as debris to pass through the valve unrestricted, at any water pressure.

Figure 10:
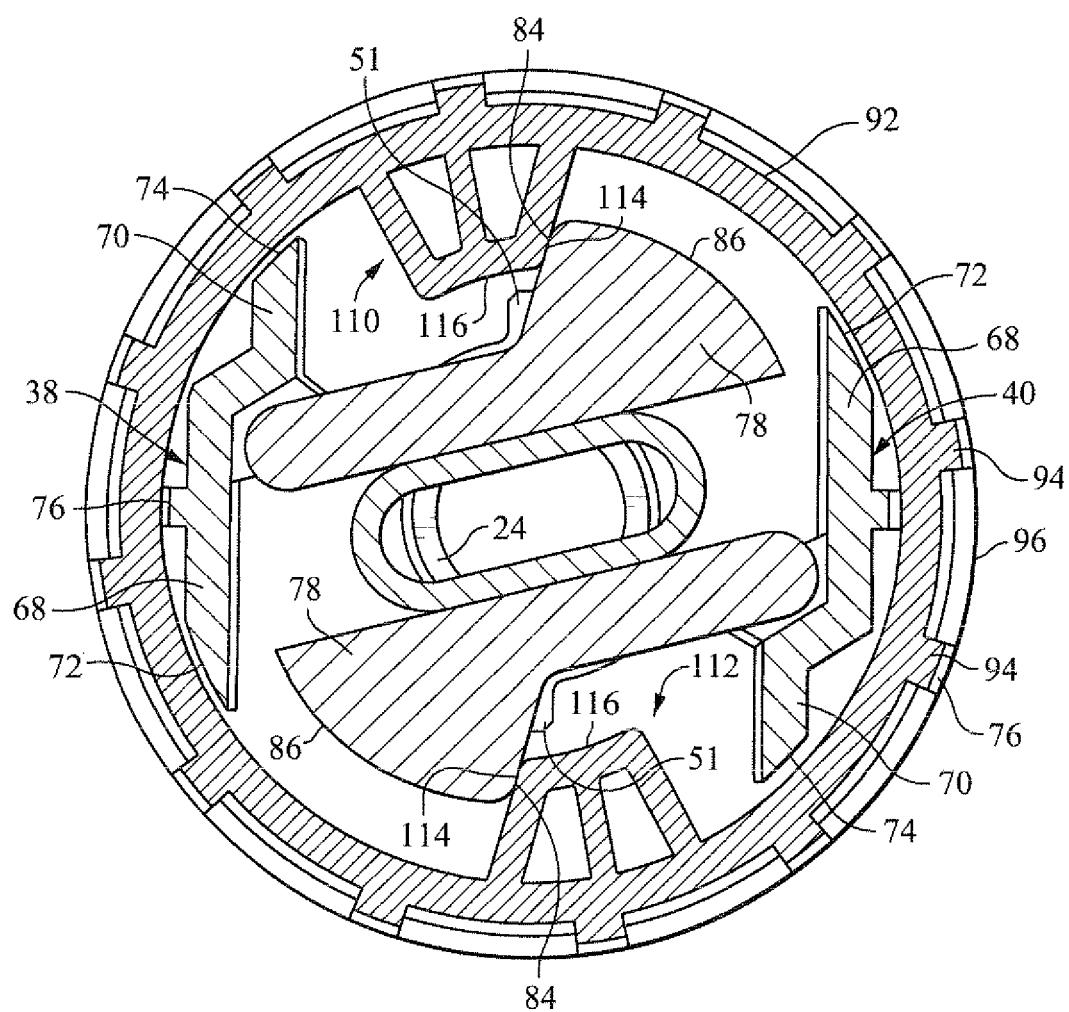
FIG. 10 is a cross section similar to FIG. 9 but with the actuator dial rotated to begin pinching the pinch tube.
Figure 11:
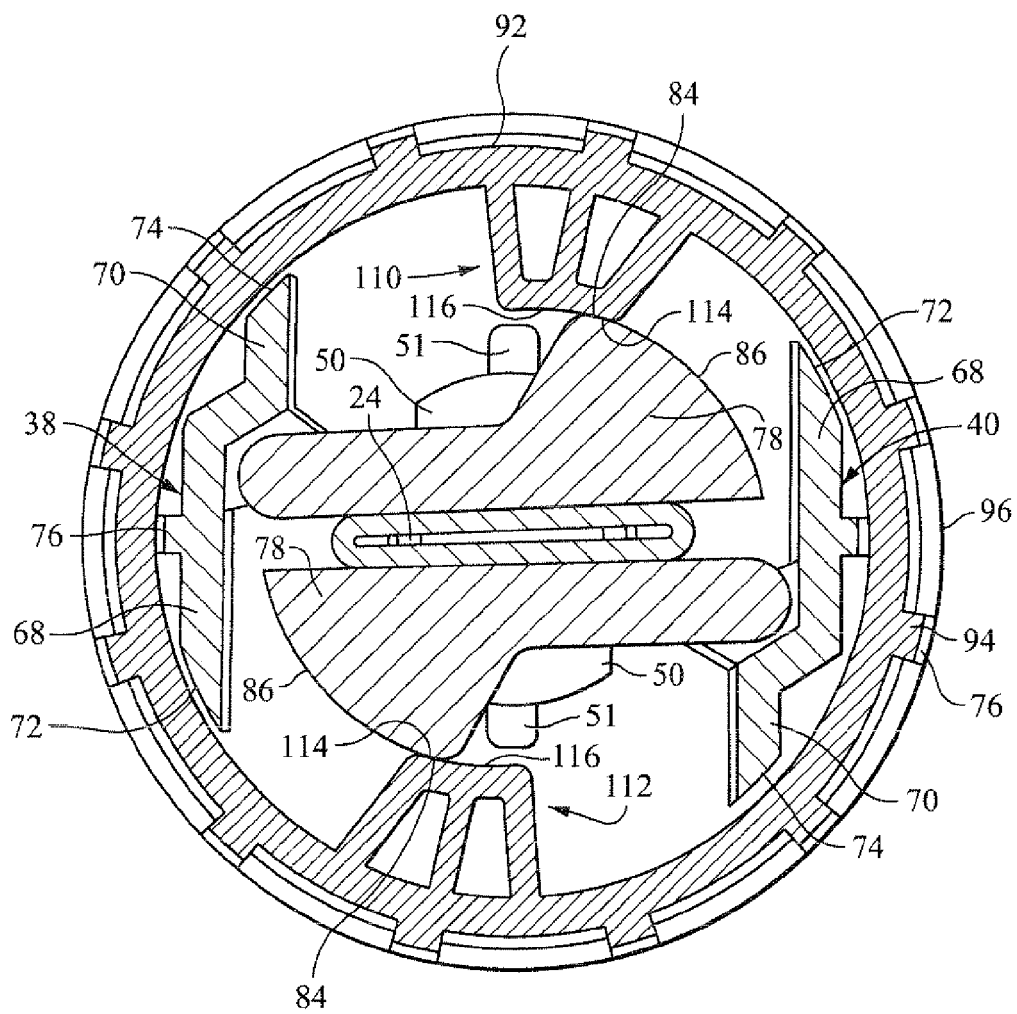
FIG. 11 is a cross section similar to FIG. 10 but with the actuator dial rotated further to a position where the pinch tube is almost closed.

As the actuator dial 12 is rotated in a clockwise direction (as viewed in the figures) the first actuator surfaces 114 of the cam lobes 110, 112 ride along the first cam surfaces 84 of the pinch arms 20, 22, causing the latter to rotate in a clockwise direction about their respective pivot posts 64 and move inwardly to begin pinching the pinch tube 24 as shown in FIG. 10. The length of the pinch arms, the location of the earn follower surfaces 84, 86 at remote ends of the pinch arms 20, 22, and the steep contact angle of the respective first cam lobe surfaces 114 produce quick and effective pinching action with only minimal rotation of the actuator dial 12. This initial caroming action may be referred to as the "quick movement" area of the pinch operation.

Continued rotation of the actuator dial 12 (FIG. 11) causes the second cam actuator surfaces 116 of the cam lobes 110, 112 to engage the second can follower surfaces 86 of the pinch arms 20, 22 in a "high torque" or "high-squeeze" area of the pinch operation, thereby pivoting the pinch arms further in the inward direction, with greater force applied to the pinch tube 24, but with little additional rotation of the dial actuator 12. Now, as the matched second actuator surfaces 116 move further along the second cam follower surfaces 86, the pinch aims 20, 22 are moved to their fully closed position (FIG. 12) to completely shut off the flow through the pinch tube 24 and thus shut off the valve 10.

Note that the pinch arms are shaped such that the pinch surfaces 88 of the pinch arms 20, 22 remain substantially parallel as they close the pinch tube, avoiding any undesirable sliding friction between the pinch arms 20, 22 and the pinch tube 24 that might otherwise result in unacceptable wear on the pinch tube. In other words, the rotary or pivoting action of the dial actuator 12 is converted to substantially linear motion of the parallel pinch surfaces 88. Viewing the sequence illustrated in FIGS. 8-12, it can be seen that movement of the pinch arms 20, 22 from the fully open to the fully closed position requires rotation of the dial actuator 12 only through about 65 degrees.

Figure 12:
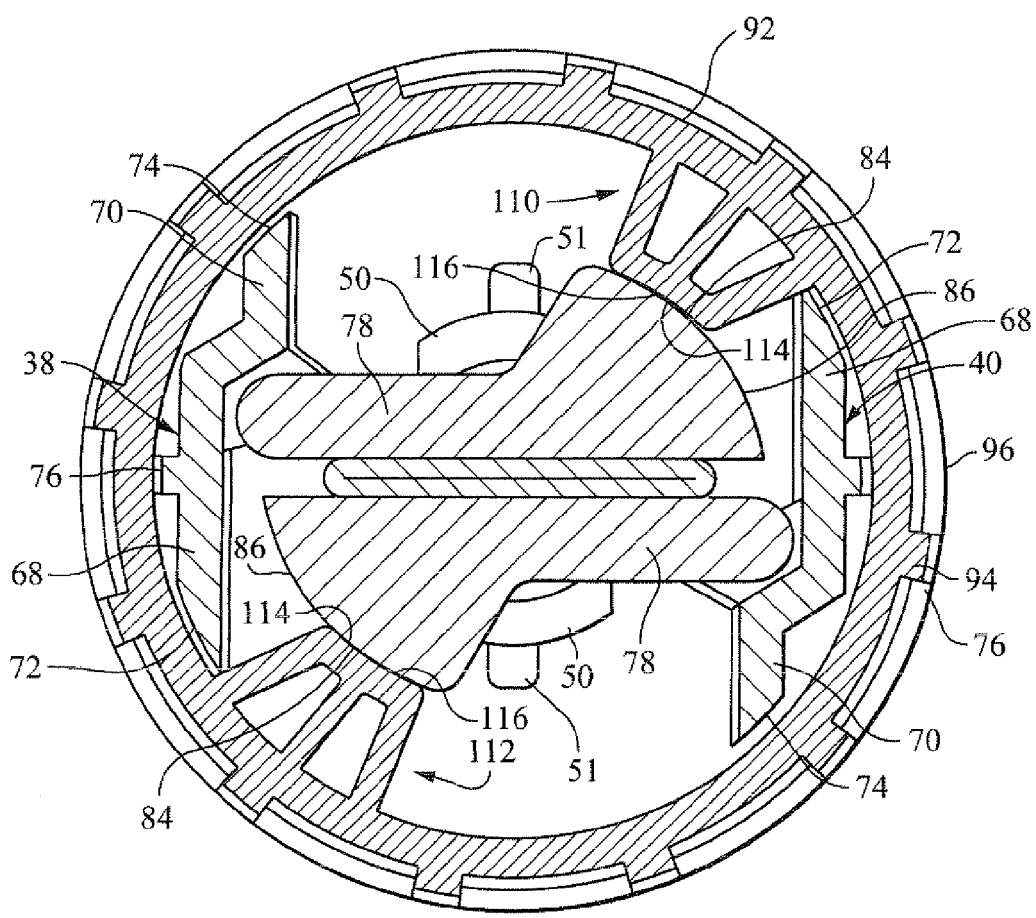
FIG. 12 is a cross section similar to FIG. 10 but with the actuator dial rotated further to a fully closed position, shutting off the pinch tube.
Figure 13:
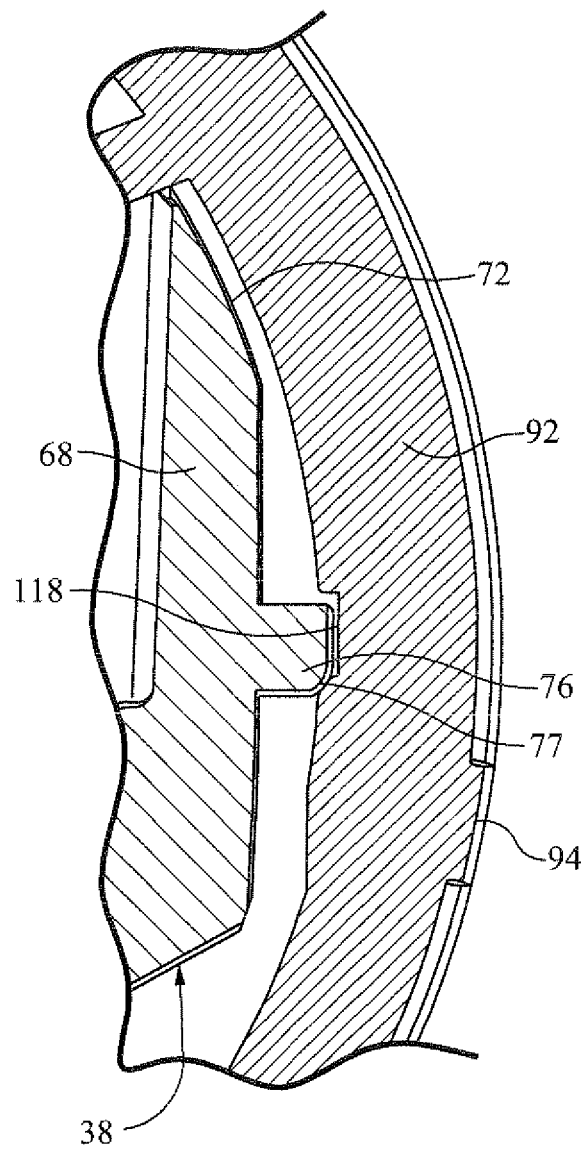
FIG. 13 is a detail showing the manner in which the actuator dial is releasably held relative to the valve body in a fully locked position.

Curved ends 72, 74 of the pinch arm supports or wall portions 38, 40 act as stops for the rotary actuator dial 12 in both directions of rotation when engaged by third surfaces 120 of the Cain lobes 112, 114, as best seen in FIGS. 9, 12 and 13.

Rotation of the actuator dial 12 in the opposite (or counterclockwise) direction will open the valve with the assistance of the inherent spring force of the elastic pinch tube 24 and the force exerted by the flow of water through the pinch tube.

FIG. 13 also shows in more detail the engagement of one of the tabs 76 within the notch or detent 118 on the inside of the actuator dial 12 when the actuator dial 12 is rotated to the fully closed position, establishing a releasable friction latch that prevents the valve from unintentionally opening. The beveled or rounded edge 77 of the tab 76 (and complimentary rounded edge of the notch 118) facilitate rotation of the dial actuator 12 in the opposite direction to open the valve.

FIG. 14 shows in greater detail the manner in which the actuator dial 12 is retained on the valve body 18 by the interaction between the upstanding resilient tabs 100 and the annular rim 104 at the base of the adaptor 14. In the assembly of the valve, the actuator dial 12 is located such that the center opening 102 is received over the adaptor 14, and the tabs 100 snapped over the rim 104.

Figure 15:
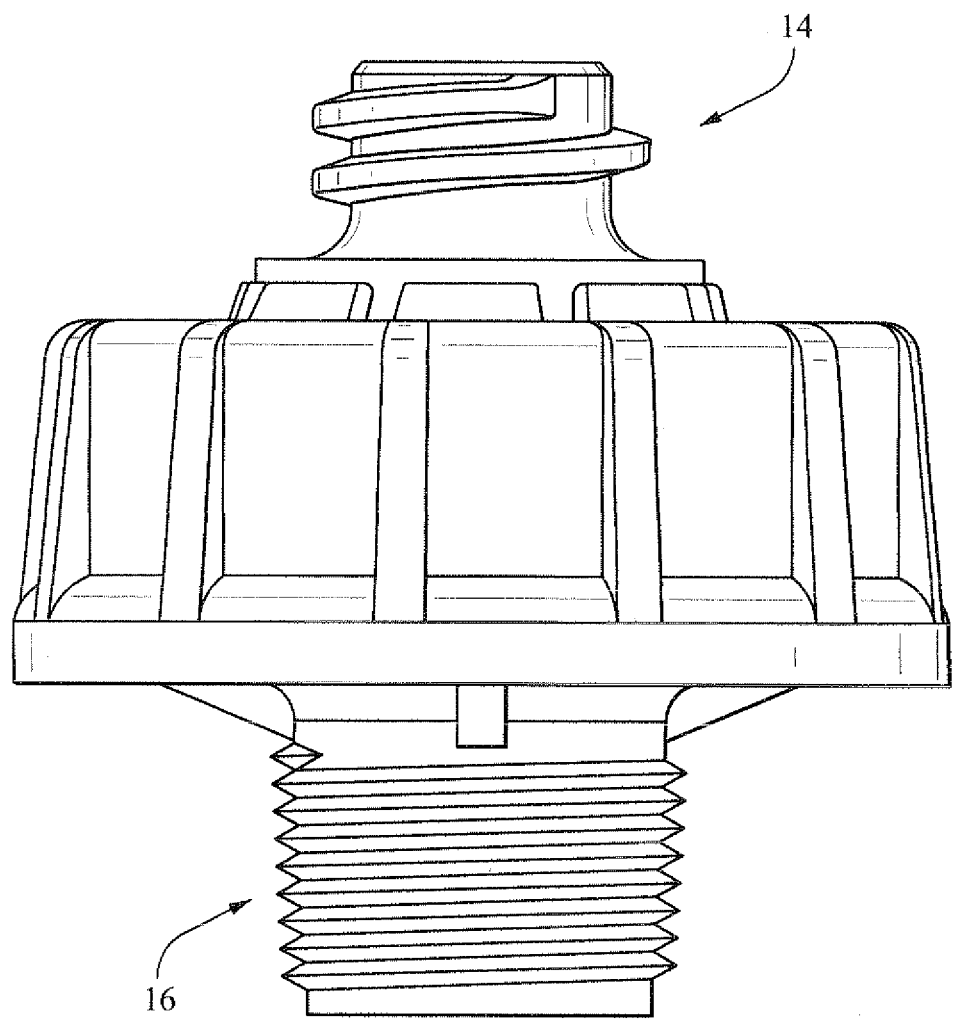
FIG. 15 is a side elevation of a rotary pinch valve as shown in FIGS. 1-13 but with an alternative adaptor configuration.
Figure 16:
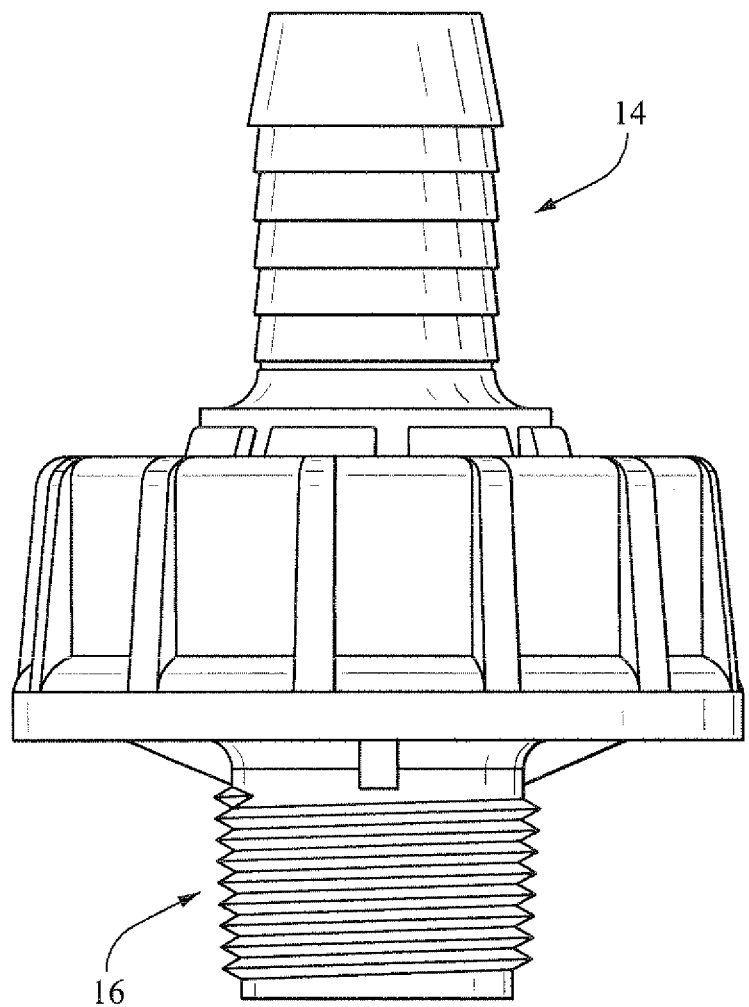
FIG. 16 is a side elevation of a rotary pinch valve as shown in FIGS. 1-13 but with another alternative adaptor configuration.

FIGS. 15 and 16 illustrate different adaptor combinations that facilitate attachment of the pinch valve at its opposite ends to hoses, risers, conduits, sprinklers, etc. In FIGS. 1, 15 and 16, the lower adaptor 16 is formed with a ¾ MNPT thread. FIG. 1 shows adaptor 14 with a similar thread configuration. FIG. 15 shows the adaptor 14 with a special Acme thread, while FIG. 16 shows the adaptor 14 with a barbed hose fitting. It will be appreciated that any combination of adaptor configurations may be used, including other equivalent fittings not shown.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary pinch valve comprising:
   a valve body having an inlet and an outlet; said valve body supporting a pinch tube and a pair of pivotally mounted pinch arms, each pinch arm having a pivot post at one end thereof, straight and arcuate cam follower surfaces along one edge and a pinch surface along another edge, said pinch tube forming part of an axial flowpath from said inlet to said outlet; a valve actuator dial received on said valve body and formed with a pair of internal cam lobes each engageable, sequentially with said straight and arcuate cam follower surfaces upon rotation of said valve actuator dial to pivot said pair of pinch arms from an open position out of engagement with said pinch tube to a closed position where said pinch surfaces engage and close said pinch tube to thereby shut off flow through said valve body.

2. The rotary pinch valve of claim 1 wherein said pinch tube is retained in said valve body by a pair of retaining rings at opposite ends of said pinch tube.

3. The rotary pinch valve of claim 1 wherein said pinch surfaces of the respective pinch arms remain substantially parallel to each other during pivotal movement of said pinch arms from said open position to said closed position.

4. The rotary pinch valve of claim 1 wherein said pivot post is received within a pair of vertically-spaced sockets provided on said valve body.

5. The rotary pinch valve of claim 1 wherein said pinch arms and said dial actuator are provided with cooperating surface features for releasably holding said pinch arms in said closed position.

6. The rotary pinch valve of claim 5 wherein said cooperating features include tabs and detents.

7. The rotary pinch valve of claim 1 wherein said valve body is provided with coupling adaptors at said inlet and outlet ends, said coupling adaptors comprising screw threads or barbed hose connectors.

8. A rotary pinch valve comprising a valve body having an inlet and an outlet; said valve body supporting a pinch tube and a pair of pivotally mounted pinch arms, said pinch tube forming part of an axial flowpath from said inlet to said outlet;

a valve actuator dial received on said valve body and formed with a pair of internal cam lobes engageable, respectively, with cam follower surfaces on each of said pair of pivotally mounted pinch arms upon rotation of said valve actuator dial to pivot said pair of pinch arms from an open position out of engagement with said pinch tube to a closed position where said pinch arms engage and close said pinch tube to thereby shut off flow through said valve body; wherein said cam follower surfaces on each pinch arm include a first straight surface and second arcuate surface engageable, sequentially, with respective first and second actuator surfaces on each of said pair of internal cam lobes, causing said pinch arms to move from said open position to said closed position; and further wherein each pinch arm is formed with a pivot post at one end and said pair of cam follower surfaces at and adjacent an opposite end, one edge of said elongated arm formed as a pinch surface engageable with said pinch tube.

9. The rotary pinch valve of claim 8 wherein said pinch tube is retained in said valve body by a pair of retaining rings at opposite ends of said pinch tube.

10. The rotary pinch valve of claim 8 wherein the pinch surfaces of the respective pinch arms remain substantially parallel to each other during pivotal movement of said pinch arms from said open position to said closed position.

11. The rotary pinch valve of claim 8 wherein said pivot post is received within a pair of vertically-spaced sockets provided on said valve body.

12. The rotary pinch valve of claim 8 wherein said pinch arms and said dial actuator are provided with cooperating surface features for releasably holding said pinch arms in said closed position.

13. The rotary pinch valve of claim 12 wherein said cooperating features include tabs and detents.

14. The rotary pinch valve of claim 8 wherein said valve body is provided with coupling adaptors at said inlet and outlet ends, said coupling adaptors comprising screw threads or barbed hose connectors.

15. A rotary pinch valve comprising a valve body having an inlet and an outlet; said valve body supporting a pinch tube forming part of an axial flowpath from said inlet to said outlet and a pair of elongated, pivotally mounted pinch arms, each having a substantially straight pinch edge for engaging said pinch tube; a valve actuator dial received on said valve body and formed with a pair of internal cam lobes engageable, respectively, with cam follower surfaces on each of said pair of pivotally mounted pinch arms upon rotation of said valve actuator dial to pivot said pair of pinch arms from an open position out of engagement with said pinch tube to a closed position where said pinch arms engage and close said pinch tube to thereby shut off flow through said valve body; wherein the pinch arms are configured such that the pinch edges of the respective pinch arms remain substantially parallel to each other during pivotal movement of said pinch arms from said open position to said closed position; and further wherein said cam follower surfaces are configured to provide differential force application on said pinch tube as said pinch arms move from the open to the closed position.

16. The rotary pinch valve of claim 15 wherein said pinch edges are tapered.

17. The pinch valve of claim 15 wherein each cam lobe is formed with a first substantially radially-oriented actuator surface and a second substantially perpendicular arcuate actuator surface.

18. The pinch valve of claim 17 wherein each cam follower is formed with a first follower surface engageable with said first substantially radially oriented actuator surface to provide a first force application and a second cam follower surface engageable with said second substantially perpendicular arcuate surface to provide a second, stronger force application.

* * * * *